United States Patent
Moser et al.

(10) Patent No.: US 11,137,880 B2
(45) Date of Patent: *Oct. 5, 2021

(54) SYSTEM AND METHOD OF PROVIDING VISUALIZATION EXPLANATIONS

(71) Applicant: Business Objects Software Ltd., Dublin (IE)

(72) Inventors: Flavia Moser, Vancouver (CA); Scott Cameron, North Vancouver (CA); Julian Gosper, Vancouver (CA)

(73) Assignee: Business Objects Software Ltd., Dublin (IE)

( * ) Notice: Subject to any disclaimer, the term of this patent is extended or adjusted under 35 U.S.C. 154(b) by 209 days.

This patent is subject to a terminal disclaimer.

(21) Appl. No.: 16/359,735

(22) Filed: Mar. 20, 2019

(65) Prior Publication Data

US 2019/0212886 A1 Jul. 11, 2019

Related U.S. Application Data

(63) Continuation of application No. 14/586,607, filed on Dec. 30, 2014, now Pat. No. 10,338,769.

(51) Int. Cl.
*G06F 3/0482* (2013.01)
*G06F 16/248* (2019.01)

(52) U.S. Cl.
CPC .......... *G06F 3/0482* (2013.01); *G06F 16/248* (2019.01)

(58) Field of Classification Search
None
See application file for complete search history.

(56) References Cited

U.S. PATENT DOCUMENTS

| 8,447,767 | B2 | 5/2013 | Ah-pine et al. |
| 2007/0240050 | A1 | 10/2007 | Quinn-jacobs |
| 2014/0143252 | A1 | 5/2014 | Silverstein et al. |
| 2014/0337309 | A1 | 11/2014 | Thollot et al. |

(Continued)

OTHER PUBLICATIONS

"U.S. Appl. No. 14/586,607, Advisory Action dated Oct. 6, 2017", 3 pgs.

(Continued)

*Primary Examiner* — Kris E Mackes
*Assistant Examiner* — Soheila (Gina) Davanlou
(74) *Attorney, Agent, or Firm* — Schwegman Lundberg & Woessner, P.A.

(57) ABSTRACT

In some example embodiments, an indication of a selected data point of a current visualization can be received. A context of the selected data point can be determined based on a dimension of the data point, and explanation candidates can be generated based on the context of the selected data point. Each exploration candidate can have a different dimension context that is within the context of the selected data point and a corresponding value for the dimension context. For each one of the explanation candidates, a corresponding score can be generated based on a difference between the value for the explanation candidate and an average value of all the values of the explanation candidates. The explanation candidates can be ranked based on the scores. At least one of the explanation candidates can be selected based on the ranking, and selectable explanation(s) for the selected explanation candidate(s) can be displayed.

20 Claims, 10 Drawing Sheets

(56) References Cited

U.S. PATENT DOCUMENTS

| | | | |
|---|---|---|---|
| 2015/0019537 A1* | 1/2015 | Neels | G06F 16/26 |
| | | | 707/722 |
| 2015/0278371 A1* | 10/2015 | Anand | G06F 16/338 |
| | | | 707/723 |
| 2016/0055526 A1 | 2/2016 | Okuno | |
| 2016/0188598 A1 | 6/2016 | Moser et al. | |

OTHER PUBLICATIONS

"U.S. Appl. No. 14/586,607, Examiner Interview Summary dated Mar. 23, 2017", 5 pgs.

"U.S. Appl. No. 14/586,607, Examiner Interview Summary dated Sep. 18, 2018", 4 pgs.

"U.S. Appl. No. 14/586,607, Final Office Action dated Aug. 8, 2017", 14 pgs.

"U.S. Appl. No. 14/586,607, Final Office Action dated Dec. 10, 2018", 8 pgs.

"U.S. Appl. No. 14/586,607, Non Final Office Action dated Feb. 10, 2017", 21 pgs.

"U.S. Appl. No. 14/586,607, Non Final Office Action dated May 21, 2018", 21 pgs.

"U.S. Appl. No. 14/586,607, Notice of Allowance dated Feb. 21, 2019", 8 pgs.

"U.S. Appl. No. 14/586,607, Response filed Feb. 8, 2019 to Final Office Action dated Dec. 10, 2018", 20 pgs.

"U.S. Appl. No. 14/586,607, Response filed May 3, 2017 to Non Final Office Action dated Feb. 10, 2017", 13 pgs.

"U.S. Appl. No. 14/586,607, Response Filed Aug. 21, 2018 to Non Final Office Action dated May 21, 2018", 22 pgs.

"U.S. Appl. No. 14/586,607, Response filed Sep. 29, 2017 to Final Office Action dated Aug. 8, 2017", 13 pgs.

* cited by examiner

SYSTEM AND METHOD OF PROVIDING VISUALIZATION EXPLANATIONS

CROSS-REFERENCE TO RELATED APPLICATIONS

This application is a continuation of prior application Ser. No. 14/586,607, filed on Dec. 30, 2014, which is incorporated by reference herein in its entirety.

TECHNICAL FIELD

The present application relates generally to the technical field of data processing, and, in various embodiments, to systems and methods of providing visualization explanations.

BACKGROUND

In conventional data analysis tools, it can be difficult for analysts and business users to know what factors are driving or contributing to particular data points when navigating or exploring data. As a result, significant information is often overlooked.

BRIEF DESCRIPTION OF THE DRAWINGS

Some example embodiments of the present disclosure are illustrated by way of example and not limitation in the figures of the accompanying drawings, in which like reference numbers indicate similar elements, and in which.

DETAILED DESCRIPTION

Figure 1:
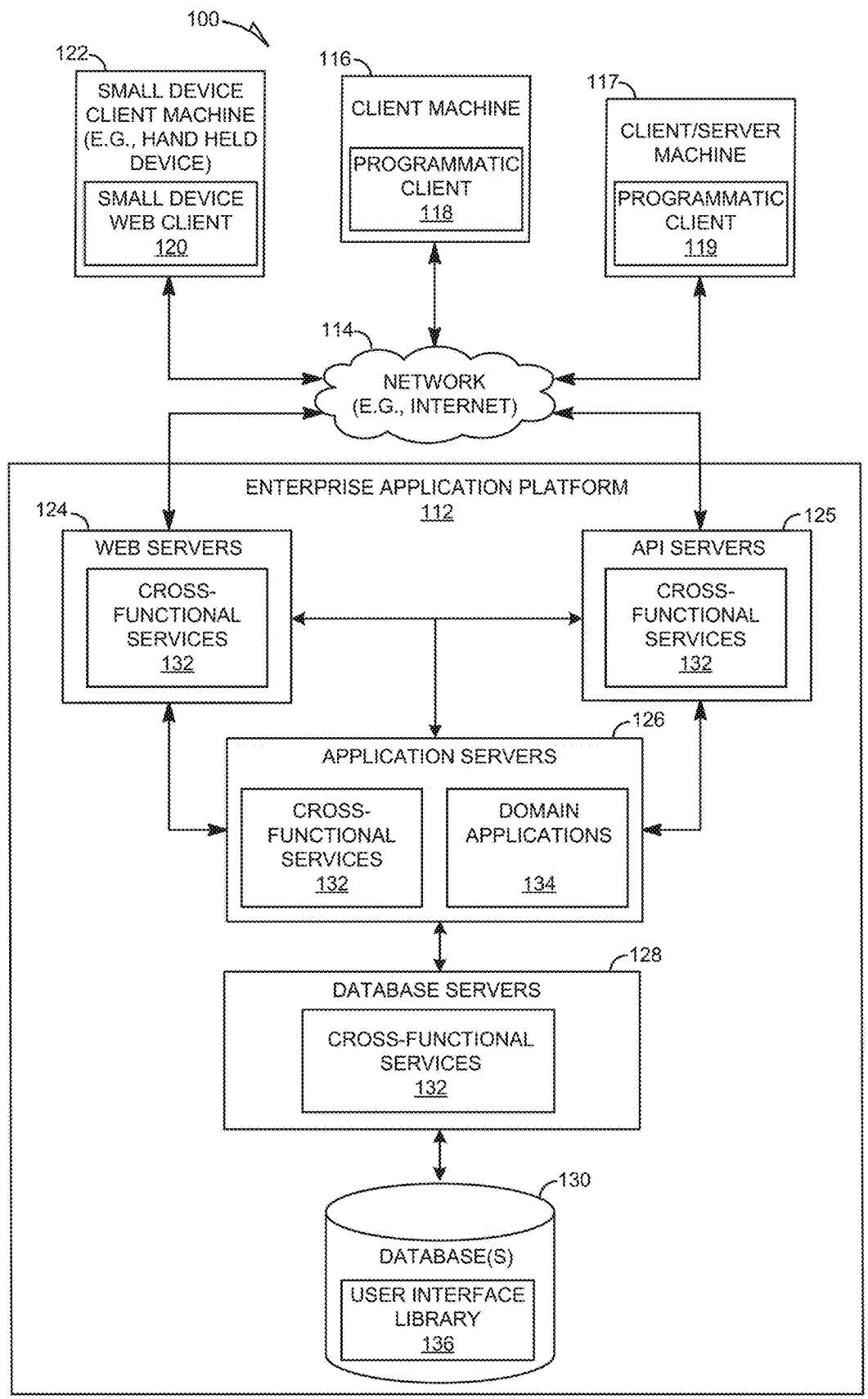
FIG. 1 is a network diagram illustrating a client-server system, in accordance with some example embodiments.

Example methods and systems of providing visualization explanations are disclosed. In the following description, for purposes of explanation, numerous specific details are set forth in order to provide a thorough understanding of example embodiments. It will be evident, however, to one skilled in the art that the present embodiments can be practiced without these specific details.

The present disclosure provides features that enable users to select a specific data point of a current visualization and receive contextualized explanations that highlight the contributing factors behind that data point. The explanations can be displayed as key points plus some amount of additional information that provides context for the key points. Different dimension slices can be used to show the most impactful contributors behind a value of the selected data point.

In some example embodiments, an indication of a selected data point of a current visualization can be received. The selected data point can be one of a plurality of data points of the current visualization. The current visualization can comprise a graphical representation of the plurality of data points, and each one of the plurality of data points can have a corresponding dimension and measure. A context of the selected data point can be determined based on the corresponding dimension of the data point. A plurality of explanation candidates can be generated based on the context of the selected data point, with each one of the plurality of exploration candidates having a different dimension context that is within the context of the selected data point, as well as a corresponding value for the dimension context. For each one of the plurality of explanation candidates, a corresponding score can be generated based on a difference between the corresponding value for the corresponding explanation candidate and an average value of all of the corresponding values of the plurality of explanation candidates. A ranking of the plurality of explanation candidates can be generated based on the scores. At least one of the explanation candidates can be selected based on the ranking. A corresponding selectable explanation for each one of the selected explanation candidate(s) can be caused to be displayed to the user in a graphical user interface of a device concurrently with the current visualization.

In some example embodiments, receiving the indication comprises receiving a user-generated interrupt comprising the indication, with the user-generated interrupt being based on a user selection of the data point. The current visualization can be caused to be displayed in a first dedicated section of the graphical user interface for current visualizations, and the corresponding selectable explanation for each one of the selected at least one explanation candidate can be caused to be displayed in a second dedicated section of the graphical user interface for explanations. A user selection of the corresponding selectable explanation of one of the selected explanation candidate(s) can be received, and a graphical representation corresponding to the selected explanation can be caused to be displayed as a subsequent current visualization in the first dedicated section.

In some example embodiments, the current visualization can comprise a chart. Each measure of the plurality of data points can comprise a numeric value.

In some example embodiments, each corresponding value for the plurality of explanation candidates can comprise a maximum value for the corresponding dimension context of the corresponding explanation candidate. Generating the plurality of explanation candidates can comprise applying a tuple of the selected data point of the current visualization as a filter.

The methods or embodiments disclosed herein may be implemented as a computer system having one or more modules (e.g., hardware modules or software modules). Such modules may be executed by one or more processors of the computer system. In some example embodiments, a non-transitory machine-readable storage device can store a set of instructions that, when executed by at least one processor, causes the at least one processor to perform the operations and method steps discussed within the present disclosure.

FIG. 1 is a network diagram illustrating a client-server system 100, in accordance with some example embodiments. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the example enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The cross-functional services 132 can include relational database modules to provide support services for access to the database(s) 130, which includes a user interface library 136. The web servers 124, API servers 125, application servers 126, and database servers 128 can host cross-functional services 132. The application servers 126 can further host domain applications 134.

The cross-functional services 132 provide services to users and processes that utilize the enterprise application platform 112. For instance, the cross-functional services 132 can provide portal services (e.g., web services), database services and connectivity to the domain applications 134 for users that operate the client machine 116, the client/server machine 117 and the small device client machine 122. In addition, the cross-functional services 132 can provide an environment for delivering enhancements to existing applications and for integrating third-party and legacy applications with existing cross-functional services 132 and domain applications 134. Further, while the system 100 shown in FIG. 1 employs a client-server architecture, the embodiments of the present disclosure are of course not limited to such an architecture, and could equally well find application in a distributed, or peer-to-peer, architecture system.

The enterprise application platform 112 can implement partition level operation with concurrent activities. For example, the enterprise application platform 112 can implement a partition level lock, a schema lock mechanism, manage activity logs for concurrent activity, generate and maintain statistics at the partition level, and efficiently build global indexes. The enterprise application platform 112 is described in greater detail below in conjunction with FIG. 2.

Figure 2:
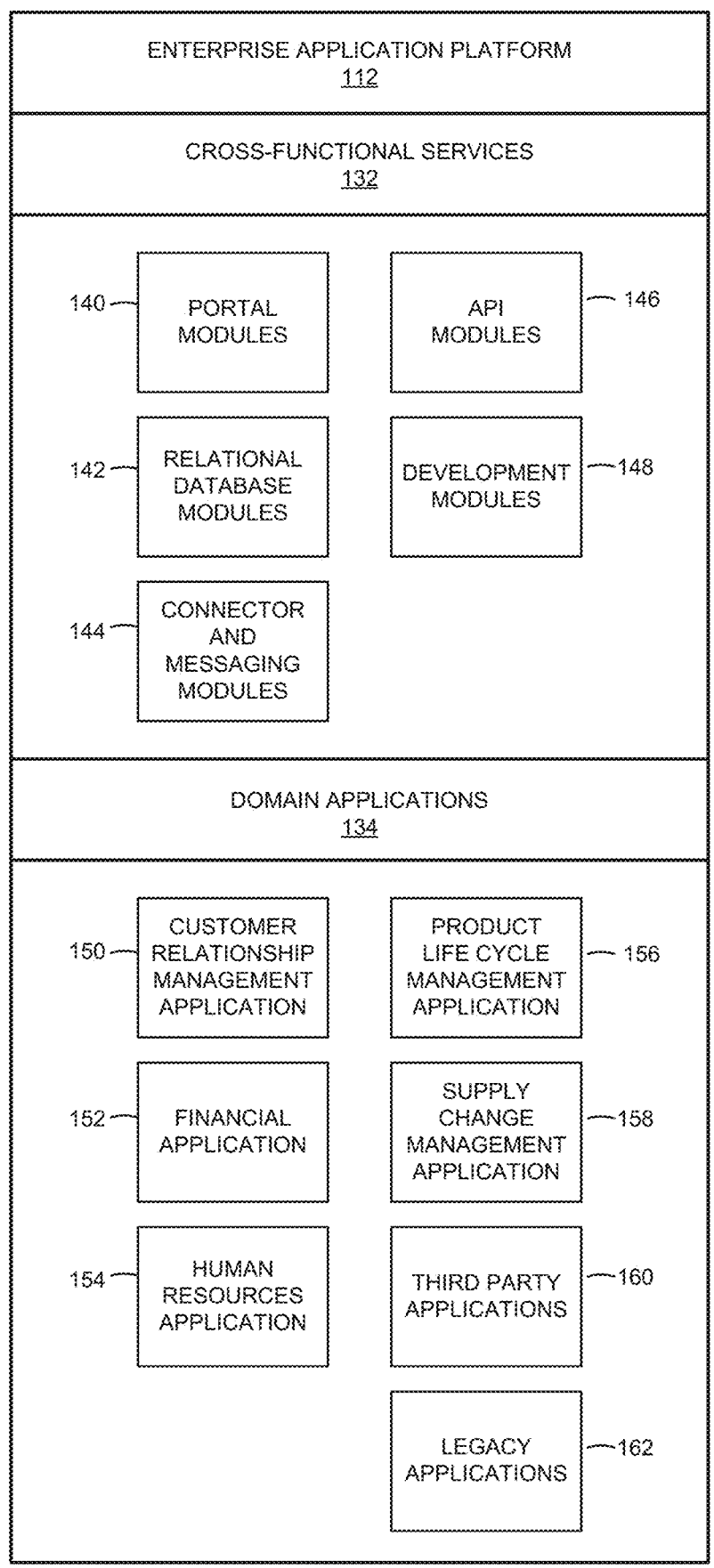
FIG. 2 is a block diagram illustrating enterprise applications and services in an enterprise application platform, in accordance with some example embodiments.

FIG. 2 is a block diagram illustrating enterprise applications and services in an enterprise application platform 112, in accordance with an example embodiment. The enterprise application platform 112 can include cross-functional services 132 and domain applications 134. The cross-functional services 132 can include portal modules 140, relational database modules 142, connector and messaging modules 144, API modules 146, and development modules 148.

The portal modules 140 can enable a single point of access to other cross-functional services 132 and domain applications 134 for the client machine 116, the small device client machine 122, and the client/server machine 117. The portal modules 140 can be utilized to process, author and maintain web pages that present content (e.g., user interface elements and navigational controls) to the user. In addition, the portal modules 140 can enable user roles, a construct that associates a role with a specialized environment that is utilized by a user to execute tasks, utilize services and exchange information with other users and within a defined scope. For example, the role can determine the content that is available to the user and the activities that the user can perform. The portal modules 140 include a generation module, a communication module, a receiving module and a regenerating module. In addition the portal modules 140 can comply with web services standards and/or utilize a variety of Internet technologies including Java, J2EE, SAP's Advanced Business Application Programming Language (ABAP) and Web Dynpro, XML, JCA, JAAS, X.509, LDAP, WSDL, WSRR, SOAP, UDDI and Microsoft .NET.

The relational database modules 142 can provide support services for access to the database(s) 130, which includes a user interface library 136. The relational database modules 142 can provide support for object relational mapping, database independence and distributed computing. The relational database modules 142 can be utilized to add, delete, update and manage database elements. In addition, the relational database modules 142 can comply with database standards and/or utilize a variety of database technologies including SQL, SQLDBC, Oracle, MySQL, Unicode, JDBC, or the like.

The connector and messaging modules 144 can enable communication across different types of messaging systems that are utilized by the cross-functional services 132 and the domain applications 134 by providing a common messaging application processing interface. The connector and messaging modules 144 can enable asynchronous communication on the enterprise application platform 112.

The API modules 146 can enable the development of service-based applications by exposing an interface to existing and new applications as services. Repositories can be included in the platform as a central place to find available services when building applications.

The development modules 148 can provide a development environment for the addition, integration, updating and extension of software components on the enterprise application platform 112 without impacting existing cross-functional services 132 and domain applications 134.

Turning to the domain applications 134, the customer relationship management application 150 can enable access to and can facilitate collecting and storing of relevant personalized information from multiple data sources and business processes. Enterprise personnel that are tasked with developing a buyer into a long-term customer can utilize the customer relationship management applications 150 to provide assistance to the buyer throughout a customer engagement cycle.

Enterprise personnel can utilize the financial applications 152 and business processes to track and control financial transactions within the enterprise application platform 112. The financial applications 152 can facilitate the execution of operational, analytical and collaborative tasks that are associated with financial management. Specifically, the financial applications 152 can enable the performance of tasks related to financial accountability, planning, forecasting, and managing the cost of finance.

The human resource applications 154 can be utilized by enterprise personnel and business processes to manage, deploy, and track enterprise personnel. Specifically, the human resource applications 154 can enable the analysis of human resource issues and facilitate human resource decisions based on real time information.

The product life cycle management applications 156 can enable the management of a product throughout the life cycle of the product. For example, the product life cycle management applications 156 can enable collaborative engineering, custom product development, project management, asset management and quality management among business partners.

The supply chain management applications 158 can enable monitoring of performances that are observed in supply chains. The supply chain management applications 158 can facilitate adherence to production plans and on-time delivery of products and services.

The third-party applications 160, as well as legacy applications 162, can be integrated with domain applications 134 and utilize cross-functional services 132 on the enterprise application platform 112.

In some example embodiments, features of the present disclosure assist users during data exploration by providing explanations of selected data points of visualizations. Visualizations can comprise graphical representations of data, such as charts, including measures and dimensions. A measure can be any property on which calculations (e.g., sum, count, average, minimum, maximum) can be made. A dimension can be a structure that categorizes or labels measures.

The currently active visualization (e.g., the visualization that the user has generated and is currently viewing) can be the starting point for the visualization explanations, with explanation candidates being determined based on a selection of a data point of the current visualization. The explanation candidates can be scored and ranked to maximize the relevancy and interest to the user of the explanations that are eventually presented to the user.

Figure 3:
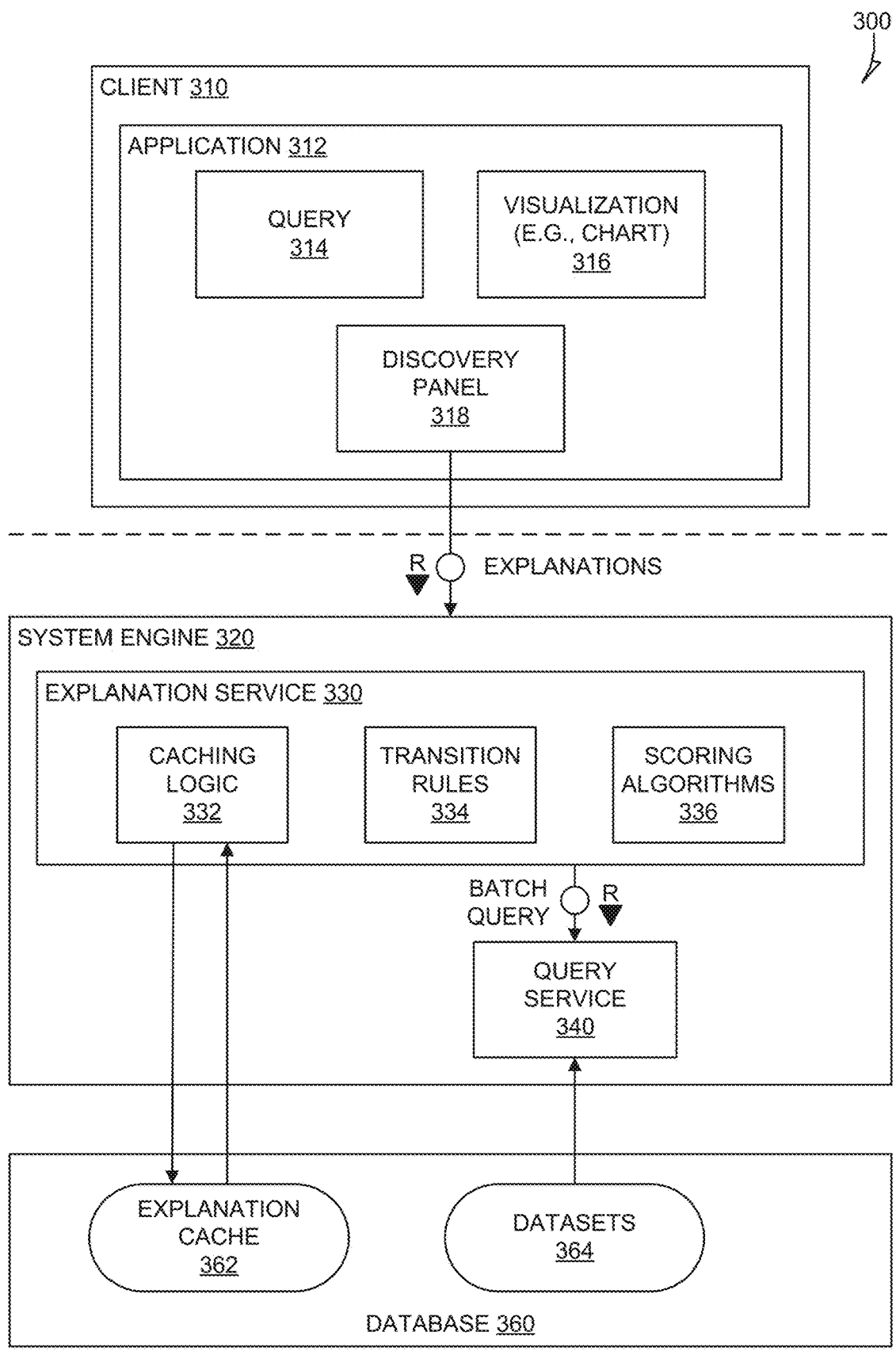
FIG. 3 illustrates a system architecture for providing visualization explanations, in accordance with some example embodiments.

The visualization explanations can be presented in a side-panel and can be consumed or ignored as the user wishes. The visualization explanations can aid the users when they are stuck and do not know where to go next in terms of data exploration (e.g., what data to explore), but can also be presented in a peripheral area of the user interface so that they can be easily ignored by users who already know exactly where they want to go in terms of data exploration FIG. 3 illustrates a system architecture 300 for providing visualization explanations, in accordance with some example embodiments. The system architecture 300 can comprise three layers: a client 310, a system engine 320, and a database 360. In some example embodiments, the client 310 is incorporated into one of the client machines 116, 117, or 122 in FIG. 1, the system engine 320 is incorporated into application servers 126 in FIG. 1, and the database 360 is incorporated into database(s) 130 in FIG. 1. However, it is contemplated that other configurations are also within the scope of the present disclosure.

A user can use an application 312 on the client 310 to explore data. The user can use the application 312 to generate a query to obtain data via a query component 314 of the application 314. The user can use a visualization component 316 of the application 312 to generate a current visualization of the obtained data, such as a chart. The application 312 can also comprise a discovery panel component 318 to present visualization explanations to the user concurrently with the current visualization. The discovery panel component 318 can request visualization explanations from the system engine 320. The system engine 320 can comprise an explanation service 330 that is configured to generate visualization explanations and return them to the discovery panel component 318 based on the request. The database 360 can store one or more datasets 364, from which data can be obtained in the generation of the current visualization and visualization explanations.

Figure 4A:
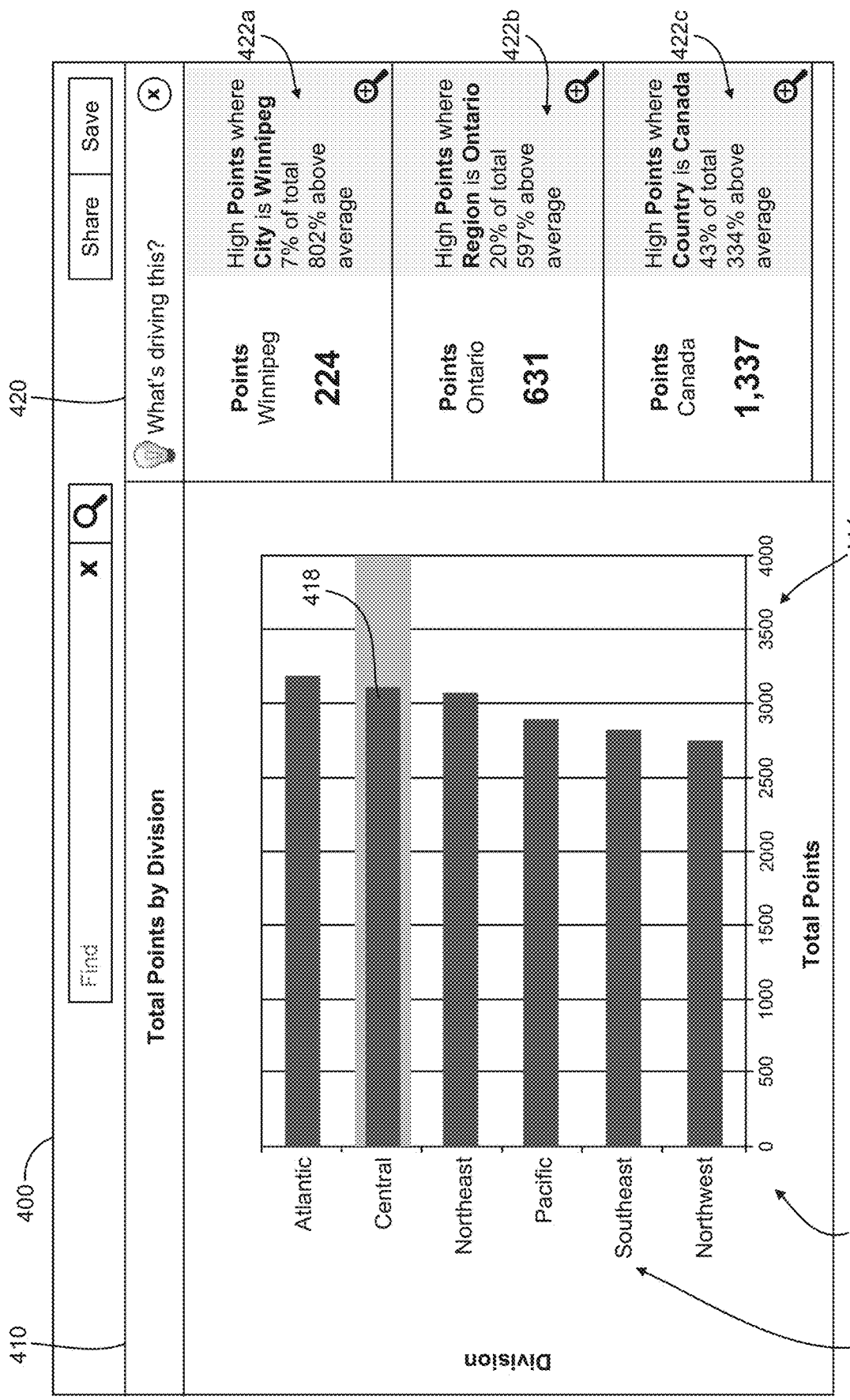
FIGS. 4A-4B illustrate a user interface displaying a current visualization and visualization explanations, in accordance with some example embodiments.

FIG. 4A illustrates a user interface 400 displaying a current visualization 412 and visualization explanations 422a-422c, in accordance with some example embodiments. The current visualization 412 can be displayed in a first dedicated section 410 (e.g., a main panel) of the user interface 400 that is dedicated to current visualizations 412, and the visualization explanations 422a-422c can be displayed in a second dedicated section 420 (e.g., a side panel) of the user interface 400 that is dedicated to visualization explanations 422a-422c. As will be discussed in further detail below, the visualization explanations 422a-422c can be selectable by a user (e.g., by a user clicking or tapping on them via the user interface 400).

The current visualization 412 can be a graphical representation of at least a portion of data of a dataset. The dataset can comprise a plurality of measures and a plurality of dimensions, and the data of the current visualization 412 can comprise at least one measure 414 (e.g., Total Points in FIG. 4) from the plurality of measures of the dataset and at least one dimension 416 (e.g., Division in FIG. 4) of the plurality of dimensions of the dataset. As previously mentioned, a measure 414 can be any property on which calculations can be made (e.g., numeric values), and a dimension 416 can be a structure that categorizes or labels measures 414. The current visualization 412 can comprise a graphical representation of a plurality of data points 418. Each one of the plurality of data points 418 can have a corresponding dimension 416 and measure 414. The current visualization 412 can comprise a bar chart, a group bar chart, a stacked bar chart, a dual bar chart, a scatter plot, a pie chart, a time chart, a stacked time chart, a dual time chart, a key point chart, or a geographic chart. Other types of charts and visualizations are also within the scope of the present disclosure.

In the example embodiment of FIG. 4A, the current visualization 412 is based on a dataset of players in a hockey league and comprises a bar chart plotting the sum of points for each division in the hockey league. A data point 418 has been selected, which can be visually indicated by the selected data point 418 being highlighted as illustrated in FIG. 4A. The selected data point 418 can represent the number of points scored by players on teams in the Central Division of the hockey league (e.g., a total of just over 3000 points, as illustrated in FIG. 4A). In the second dedicated section 420, which can be configured and presented as a side panel, a number of different contextual explanations 422a-422c are displayed to provide additional insight into the selected data point 418. The top explanation 422a indicates that, of the more than 3000 points scored by players in the Central Division, 224 points were scored by players born in Winnipeg, the middle explanation 422b indicates that 631 of the Central Division's points were scored by players from Ontario, and the bottom explanation 422c indicates that 1,337 of the Central Division's points were scored by players from Canada.

Figure 4B:
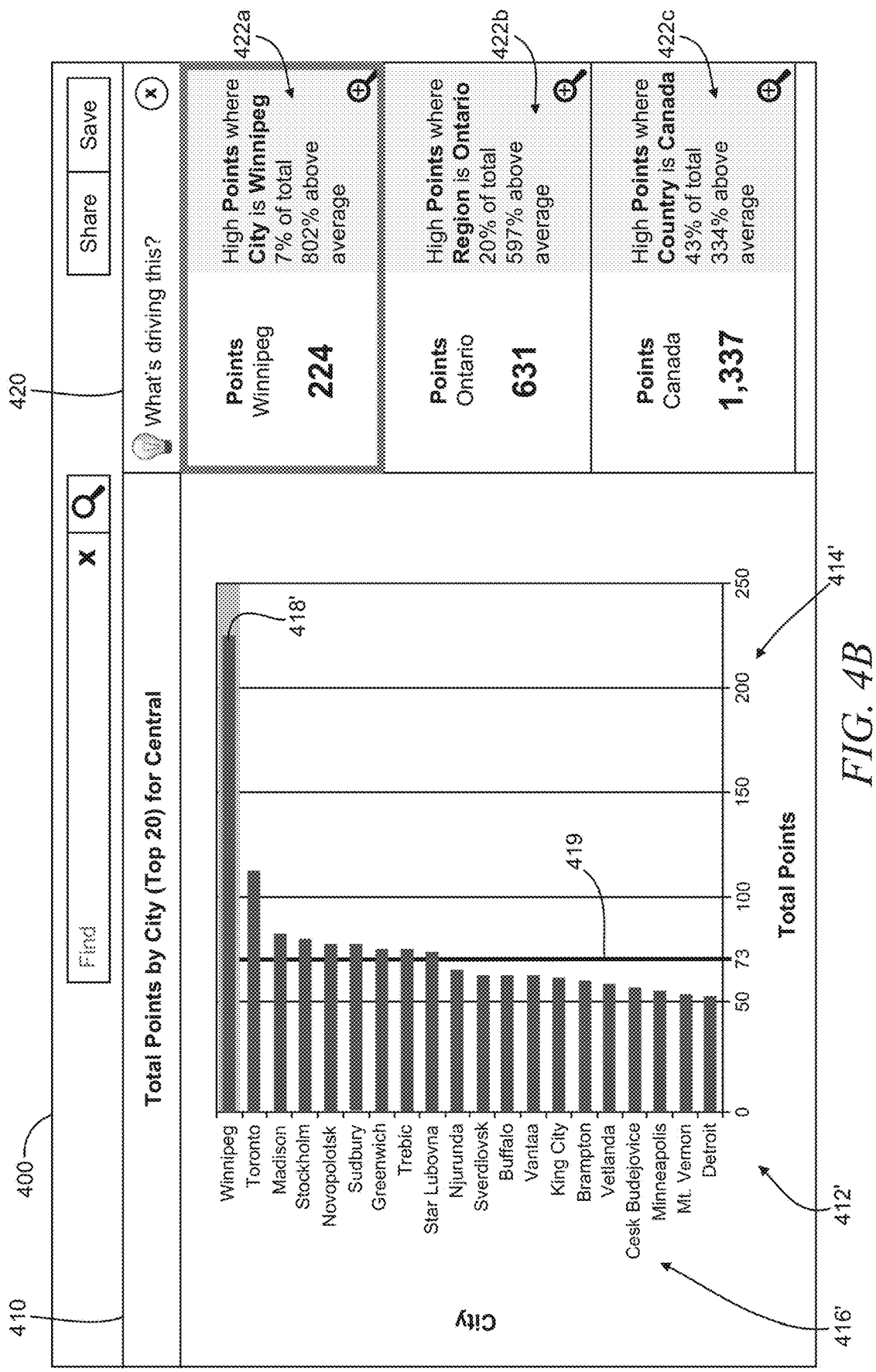

In response to one of the explanations 422a-422c being selected, one or more values from that selected explanation can be displayed in a broader context. In some example embodiments, a graphical representation of the selected explanation can be displayed as the current visualization in the first dedicated section 410. FIG. 4B illustrates one example embodiment of explanation 422a having been selected (e.g., clicked by the user), as indicated by explanation 422a being highlighted, and a graphical representation of the explanation 422a being displayed as the current visualization 412' in the first dedicated section 410. This subsequent current visualization 412' (e.g., the current visualization resulting from a previous selection) can have at least one measure 414' and at least one dimension 416'. The current visualization 412' can comprise a graphical representation of a plurality of data points 418'. Each one of the plurality of data points 418' can have a corresponding dimension 416' and measure 414'. Additionally, in some example embodiments, the explanation service 330 can determine an mean value of the data points 418' and cause a representation 419 of that mean value to be presented as part of the current visualization 412'. Statistical values other than a mean value can also be used, including, but not limited to, median and mode.

As illustrated in FIG. 4B, the data point 418' representing the 224 points for players from Winnipeg can be highlighted in the context of another bar chart showing a comparison against other cities, such as Toronto, Madison, Stockholm, and the like, as a result of the selected explanation 422a comprising data corresponding to the 224 points for players from Winnipeg. In some example embodiments, this subsequent current visualization 412' (e.g., the second bar chart) is based on a filter being applied to only include data points that fall within the context of the Central Division. As a result, the data points 418' of the subsequent current visualization 412' can be restricted to only those data points 418' that are within the context of the initially selected data point 418 in the previous current visualization 418 in FIG. 4A. Based on subsequent current visualization 418' in FIG. 4B, it can quickly be seen that the number of Central Division points scored by players from Winnipeg far outweighs points scored by players from any other city. This difference makes Winnipeg an interesting component of the number of total points scored in the Central Division.

In some example embodiments, one of the data points 418' in the subsequent current visualization 412' can then be selected, and additional explanations can be generated and displayed to the user based on the selected data point 418'. Similar generations and displays of additional explanations can be performed for additional subsequent current visualizations.

Referring back to FIG. 3, the explanation service 330 can be configured to coordinate the retrieval and ranking of visual explanations. In some example embodiments, a context-appropriate set of transition rules 334 can be applied to determine potentially viable explanation candidates before running specific scoring algorithms 336 to determine which explanation candidates are the "best" explanations (e.g., which explanation candidates to return for display as explanations to the user).

A transition in the context of the explanation service 330 can be a navigation from one input context to one or more other data points having additional information, or put another way, from a context to an explanation. The input context can comprise a description or an identification of a single data point, such as the selected data point. Examples of an input context include, but are not limited to, a bar of a bar chart, a section of a pie chart, and a vertex point of a time series chart.

In order to generate or determine the explanation candidates, the explanation service 330 can aggregate the context measure across the other dimensions in the dataset in the context of the original selected data point, excluding any dimensions known to be ancestors or in a 1:1 relationship with the context dimension. The explanation service 330 can use the maximum values from the aggregation as data point values for the explanation candidates. These aggregations can be performed in the context of the original selected data point, such that the resulting explanation candidates are all within the context of the selected data point that they are explaining. For example, in some example embodiments, if a user clicks on a data point representing Canada in 2002, any explanations of this selected data point must contain only data about Canada in 2002. In other words, in some example embodiments, the tuple of the original selected data point must be applied as a base filter for all aggregations when searching for explanation candidates to user in providing explanations.

Because the cost of searching through all possible transitions for every variation of visualization explanations for the current visualization can be computationally expensive, the transition rules can be used to reduce the search space, and thus explanation candidates, to only those transitions that are determined to be valuable (e.g., interesting, helpful, relevant, etc.) to the user.

The work of finding explanation candidates or determining their scores can be extremely database intensive, so performance is an important concern. The explanation service 330 can address this concern by performing two important jobs, query batching and caching. Regarding query batching, the explanation service 330 can employ a query service 340 to perform query batches in retrieving data from one or more datasets 364 in the database 360 such that table scans (and therefore data transfer in the system backend) are minimized. Regarding caching, the explanation service 330 can employ a caching logic component 332 that manages a shared cache 362 of fully formed visualization explanations or explanation candidates in the database 360. After the transition rules 334 have determined a list of explanation candidates that make sense for the provided context, the explanation service 330 can retrieve information about any of these explanation candidates that is stored in the suggestion cache 362, with only the remainder of explanation candidates in the list (e.g., explanation candidates not stored in the suggestion cache 362) needing to be data populated and scored.

The explanation service 330 can be invoked by the application component 312 in the client layer 310. In some example embodiments, the explanation service 330 is implemented on a server remote from the client 310. This configuration can have several benefits. First, it improves security. Requests can be processed in the current user's context. However, there may be scenarios where the orchestration logic may wish to take a broader view of input data (e.g., dataset statistics, user information (e.g., user type, profession), user preferences, or, potentially, knowledge base data) in order to influence the ranking of its explanations (even though the final results returned to the client 310 can be limited by user rights). The system engine 320 can utilize a technical user account and freely handle privileged data that could not be safely passed to the client 310. Second, this configuration enhances delivery simplicity. Client libraries typically need to be packaged and installed along with their consuming application. A relatively thick client library potentially increases coupling between the layers. Instead, a single layer can be employed to minimize this coupling and, along with it, minimize the need to update client code when the server changes and vice versa. And third, this configuration can minimize data transfer to the client 310.

The explanation service 330 can have an API comprising a call for an explanation, such as explain(context, n), which can accept a context object that describes a single data point (e.g., a selected data point) or multiple data points (e.g., multiple selected data points, which will be discussed in further detail later), and can return an array of explanations containing enough information to allow the client application 312 to render appropriately. The context object can comprise a tuple path along with a measure field. The API call can also allow the client 310 to specify a maximum number of explanations to return by passing in a value for n. The API for retrieving explanations can rely on passing a couple of data structures back and forth. For example, when making a call for an explanation, the client 310 can pass a context object describing the starting visualization state from which explanations are to be determined. In return, an array of explanations can be passed back containing enough information for the client 310 to render the explanations as desired.

The context object can be a serializable description of the selected data point of the current visualization that is used both as a starting point for generating explanation candidates for the selected data point, as well as in the resulting explanations themselves. In some example embodiments, the context object can be at a level of abstraction that is independent from any specific chart rendering technology. Rather, it can be a general visualization description containing information that is useful for processing and communicating explanations. In some example embodiments, the context object can comprise a visualization specification with additional information about the data query. In some example embodiments, the context object can comprise: Chart Type, Chart Geometry (e.g., ordered lists representing "axes"), Dimension IDs, Measure IDs, and filter and prompting values.

Numeric key data points can be a slightly special type because they represent a single specific value. In this case, Chart Geometry can be a Measure ID, but can be accompanied by some way to describe the specific dimensional context by which the value is defined. In online analytical processing (OLAP) terms, this can be the "tuple". In addition to the structure described above, the visualization context for a key data point can also include: Tuple (e.g., an ordered list of dimension members identifying a specific single value context). The tuple can be expressed as a set of filters, but it can be useful to keep the tuple definition distinct from any other filters that may be applied.

The return value from the call for explanations can be a list of explanation candidates ordered from highest to lowest score. Each explanation candidate object can comprise a score (e.g., a value between 0 and 1), a context, and data from the corresponding dataset. The explanation service 330 can return a variety of different types of data.

In some example embodiments, the explanation service 330 can return full chart data, thereby giving a guarantee to callers that suggestion results are internally consistent and fully renderable without requiring any additional data querying steps.

In some example embodiments, the explanation service 330 can return a potentially lower-resolution snapshot of the data appropriate only for producing a thumbnail. For example, a time series chart with many lines can be reduced to just a few lines, or scatterplots that would be overly dense in a thumbnail could have some data points removed. Limiting the data in this way has the benefit of guaranteeing that the data size never becomes too large. In returning this snapshot of the data, it can be beneficial for the explanation service 330 to acquire and use certain information. For example, the explanation service 330 can acquire and use information about the resolution of the client 310 in order to determine what level of low-resolution is appropriate. The explanation service 330 can acquire chart-specific knowledge about how to appropriately reduce resolution for that particular chart type. This creates another point of contact for extensibility and increases complexity.

The explanation service 330 can also return some additional context information to assist the client 310 in displaying an interesting text blurb within each explanation describing some facts about the explanation. In the example embodiment illustrated in FIG. 4A, the data attributes Points, City, and Winnipeg can be determined from the context of the current visualization 412, but the additional context items can be returned explicitly. One example of additional context information includes a qualifier at the beginning of the phrase saying, for example, "High" or "Low", as well as additional facts, such as a certain percentage of a total value (e.g., 7% of total) and a certain percentage above an average value (e.g., 802% above average). An additional property bag for additional information can be returned for explanations, and can comprise elements including, but not limited to, a qualifying prefix (e.g., High), and different facts (e.g., % of total, % above average). The additional context information can be determined by the explanation service 330 via a statistical analysis of the data set of the current visualization 412. The explanation service 220 can use rules for determining or identifying a "High" value (e.g., the highest value for a particular context dimension) or a "Low" value (e.g., the lowest value for a particular context dimension), as well as rules for determining or identifying statistical information (e.g., the percentage of a total value that a particular value represents, the percentage above or below an average value that a particular value represents).

In some example embodiments, some amount of structure can be applied to the additional information content such that the information can be easily communicated to the client 310 in a way that allows the client 310 to easily convert the information into display strings. Since there is likely a fairly limited set of possible content types, a simple data format that relies on a small number of predefined values for communicating these pieces of information can be created.

The explanation service 330 can employ one or more scoring algorithms 336 to determine which explanation candidates to return for display to the user. The scoring algorithms 336 can comprise a statistical analysis performed on specific data related to the selected data point in order to produce a score (or some other metric for evaluation) that can be compared against scores for other data related to the selected data point.

In some example, embodiments, the score for an explanation candidate can be based on a difference between a value for the explanation candidate and an average value of values for all of the explanation candidates, with more preference or priority (e.g., more weight) being applied to an explanation candidate the more a value of that explanation candidate is an outlier, such that a first explanation candidate having a value of a particular dimension context that is 802% above an average value of that particular dimension context for all of the explanation candidates will have a higher score than a second explanation candidate having a value of that particular dimension context that is only 230% above the average value of that particular dimension context for all of the explanation candidates. In some example embodiments, the scoring can be based on how much greater than the average value a maximum value for a particular dimension context is, such that the more of an outlier the maximum value is, the higher the score for the corresponding explanation candidate will be.

It is contemplated that the use of the term "higher" with respect to the term "score" can correspond to a likelihood that the corresponding explanation candidate will be selected rather than just a number value. Depending on how the explanation candidates are to be ranked and selected, what is considered a high score and what is considered a low score can vary. For example, a score of 0.9 is a higher number value than a score of 0.5. However, if the scoring algorithm is configured to assign a lower number value to an explanation candidate the greater that explanation candidate represents an outlier, and if the explanation candidates with the lowest number values for scores are the most likely to be selected as explanations, then 0.5 is functionally a "higher" score than 0.9 in this particular example. A direct relationship between the number value of the score and the likelihood that the corresponding explanation candidate will be selected is also within the scope of the present disclosure.

Referring to FIG. 4A, explanation 422a has a value of 224 for the dimension context of points by players born in Winnipeg, which is within the context of the selected data point of players within the Central Division. Since this value is the greatest outlier (e.g., 802% above the average value) within the different dimension contexts of points by players by city of birth (e.g., Winnipeg, Toronto, Madison), the corresponding explanation 422a is selected to be displayed to the user.

It is contemplated that factors other than the outlier factor discussed above can also be used to determine the scores for the explanation candidates, or to rank or select the explanation candidates after the scores have been determined. In some example embodiments, these factors can include, but are not limited to, usage data. Usage data can comprise information about the use of data, the use of fields of data, or the use of visualizations (e.g., charts) by a user or a group of users. The explanation service 330 can use the usage data to give priority to explanation candidates that use commonly used or popular data, fields of data, or types of visualizations. For example, the explanation service 330 can store, maintain, and access information indicating the level of usage (e.g., quantity, frequency) for data, fields of data, or types of visualizations. This information can be stored in the database 360. Explanation candidates can be scored, ranked, or selected using this information, with priority being given to explanation candidates having data or a field of data or being of a type that has a high level of usage relative to the other explanation candidates. In some example embodiments, the level of usage can be based on the level of usage for the user to which the current visualization is being displayed. For example, if the user has previously selected, or otherwise used, certain data, then any explanation candidates that include that certain data can be given additional weight in the scoring or selection of explanation candidates as explanations (e.g., be given a higher score or higher likelihood of being selected).

In some example embodiments, the level of usage can be based on the level of usage for a group of users with which the user, to which the current visualization is being displayed, is associated. This association can be based on profile information of the users. Such profile information can include, but is not limited to, the user's occupation, company, organization, geographic information (e.g., country), usage patterns, age, or gender. For example, if other users having similar profile information as the user to which the current visualization is being presented typically select, or otherwise use, certain data, then any visualization candidates that include that certain data can be given additional weight in the scoring or selection of explanation candidates as explanations (e.g., be given a higher score or higher likelihood of being selected).

In some example embodiments, users can provide explicit feedback indicating preferences for certain data, fields of data, or types of visualizations. This feedback can then be used to affect the scoring or selection of explanation candidates, giving additional weight to explanation candidates having characteristics similar to those preferred by the user to which the current visualization is being displayed.

Performance of the explanation service 330 can be a challenge, both in terms of response time and in terms of system load. In some example embodiments, the explanation service 330 can limit the possible search space for explanation candidates in order to minimize load. In some example embodiments, ancestor dimensions (e.g., those dimensions in a 1:N relationship with the context dimensions) can be excluded.

Even in the simplest initial implementation, scoring an explanation candidate can involve calculating the average value for a measure across all rows in the dataset, which can be completed quickly inside the database, but necessarily as quick to be completed inside the system engine 320 where the scoring algorithms 336 can be run. Therefore, in some example embodiments, the scoring calculations can be performed in the database 360. The scoring algorithm module 336 can indicate the kind of data it needs in order to perform its scoring.

Figure 5:
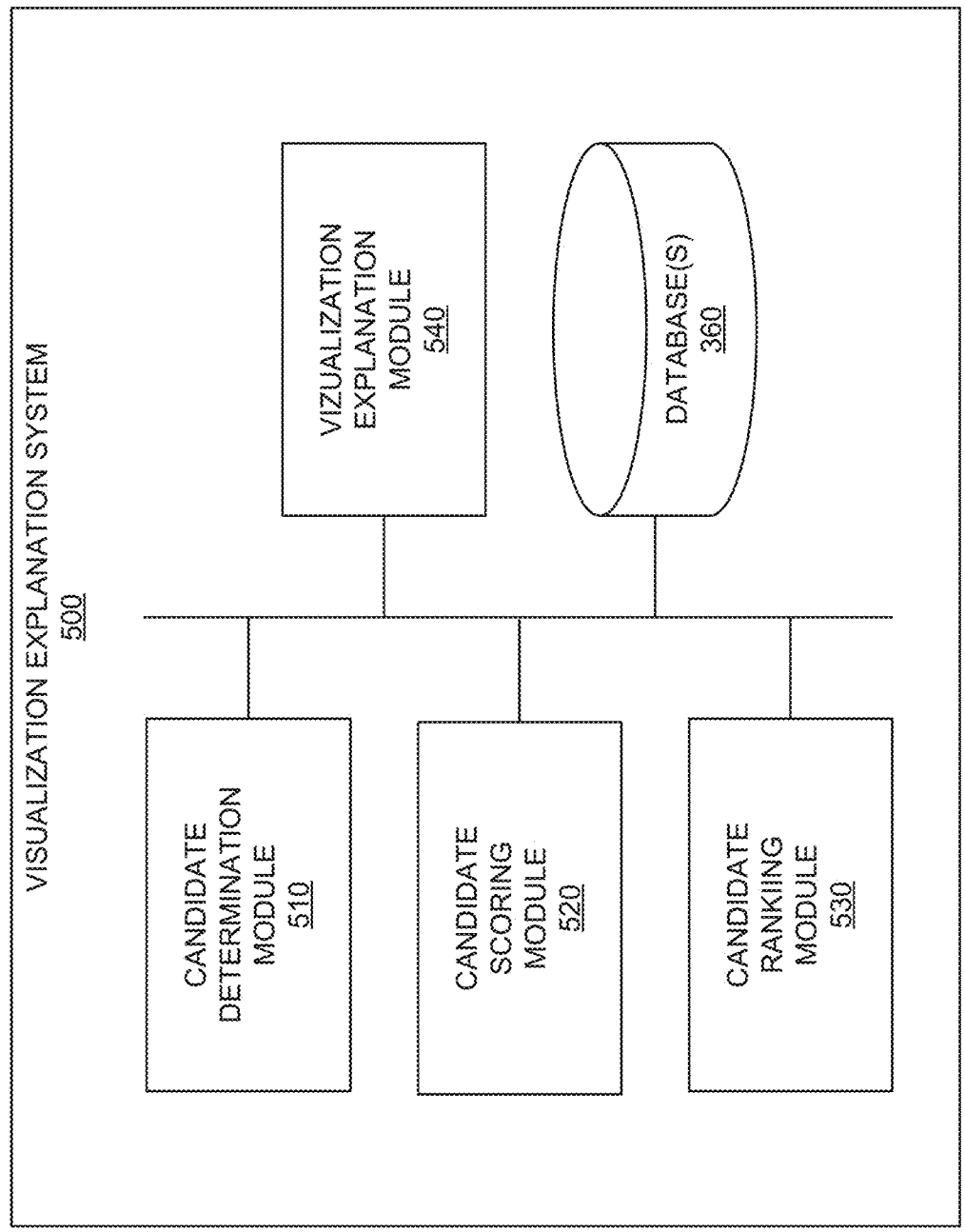
FIG. 5 is a block diagram illustrating components of a visualization explanation system, in accordance with some example embodiments.

FIG. 5 is a block diagram illustrating components of a visualization explanation system 500, in accordance with some example embodiments. The visualization explanation system 500 can comprise the components and functionality of the explanation service 330 in FIG. 3. In some example embodiments, the visualization explanation system 500 can comprise any combination of one or more of a candidate determination module 510, a candidate scoring module 520, a candidate ranking module 530, a visualization explanation module 540, and one or more databases 360. The modules 510, 520, 530, and 540 can reside on a machine having a memory and at least one processor (not shown). In some example embodiments, these modules 510, 520, 530, and 540 can be incorporated into the enterprise application platform 112 in FIG. 1 (e.g., on application server(s) 126). However, it is contemplated that other configurations are also within the scope of the present disclosure.

The candidate determination module 510 can be configured to receive an indication of a selected data point of a current visualization. The current visualization can comprise a graphical representation of the plurality of data points. Each one of the plurality of data points can have a corresponding dimension and measure. The candidate determination module 510 can determine a context of the selected data point based on the corresponding dimension of the data point, and then generate a plurality of explanation candidates based on the context. Each one of the plurality of exploration candidates can have a different dimension context that is within the context of the selected data point, as well as a corresponding value for the dimension context. In some example embodiments, the indication of the selected data point can comprise a user-generated interrupt based on a user selection of the data point. In other example embodiments, the indication of the selected data point can be based on an automatic selection of the data point (e.g., without the user clicking or otherwise selecting the data point). In some example embodiments, the candidate determination module 510 is further configured to apply a tuple of the selected data point of the current visualization as a filter in generating the plurality of explanation candidates.

The candidate scoring module 520 can be configured to generate, for each one of the plurality of explanation candidates, a corresponding score based on a difference between the value for the corresponding explanation candidate and an average value of the values of the plurality of explanation candidates, as previously discussed. In some example, embodiments, each corresponding value for the plurality of explanation candidates can comprise a maximum value for the corresponding dimension context of the corresponding explanation candidate. Furthermore, the candidate scoring module 520 can be configured to generate the scores for the plurality of explanation candidates, additionally or alternatively, based on at least one of: usage data of a data point of the corresponding visualization candidate, usage data of a measure of the corresponding visualization candidate, usage data of a dimension of the corresponding visualization candidate, usage data of a chart type of the corresponding visualization candidate, profile information of the user, and explicit user feedback for a data point, measure, dimension, or chart type of the corresponding explanation candidate.

The candidate ranking module 530 can be configured to generate a ranking of the plurality of explanation candidates based on the scores. The ranking can be in descending order of scores or in ascending order of scores.

The visualization suggestion module 540 can be configured to select at least one of the explanation candidates based on the ranking, and cause a corresponding selectable explanation for each one of the selected explanation candidate(s) to be displayed to a user in a graphical user interface of a device concurrently with the current visualization. In some example embodiments, the current visualization can be caused to be displayed in a first dedicated section of the graphical user interface for current visualizations, and the corresponding selectable explanation for each one of the selected at least one explanation candidate can be caused to be displayed in a second dedicated section of the graphical user interface for explanations. A user selection of the corresponding selectable explanation of one of the selected explanation candidate(s) can be received, and a graphical representation corresponding to the selected explanation can be caused to be displayed as a subsequent current visualization in the first dedicated section. The graphical representation corresponding to the selected explanation can additionally or alternatively be caused to be displayed in a new window, tab, dialog box, or other user interface element.

It is contemplated that the scoring and/or selection of the explanation candidates discussed above can also be based, at least in part, on a level of variance between the explanation candidates in terms of their corresponding measure(s) and/or dimension(s). In some embodiments, the variance of measures and/or dimensions between explanation candidates can be measured using analytics, and such measurements can be used to determine the scores for the explanation candidates or to determine which explanation candidates to select for use as an explanation to be presented to the user. In some example embodiments, the scoring or selection process can be configured to favor the use of explanation candidates having different measure(s) and/or dimension(s). For example, if a first explanation candidate has a first measure, such as "team name", that is determined to be equivalent to or have a threshold level of similarity with a second measure, such as "team ID", of a second explanation candidate, the score of the first explanation candidate and/or the second explanation candidate can be negatively influenced by this determination, or the explanation service 330 can determine to make a selection between the first explanation candidate and the second explanation candidate, but not a selection of both, based on the equivalency or similarity determination, since there is no substantial difference between the information being presented in the first explanation candidate and the second explanation candidate. Similarly, the greater the difference of measures and/or dimensions between explanation candidates is determined to be, the more positively the scoring and/or selection of those explanation candidates can be influenced.

Referring back to FIG. 4A, although the example embodiments disclosed therein illustrates visualization explanations 422*a*-422*c* being generated and presented based on the selection of a single data point 418, it is contemplated that, in other example embodiments, visualization explanations can be generated and presented based on the selection of multiple data points. The visualization explanation system 500 can be configured to generate and present explanations for each individual selected data point, as well as to generate and present explanations that explain one or more differences between multiple selected data points. For example, in FIG. 4A, if a user was to select both the data point corresponding to the Atlantic division and the data point corresponding to the Northwest division, the visualization explanation system 500 can generate and present one or more visualization explanations that explain the difference between the corresponding measures of these two selected divisions, for example, explaining one or more factors that caused or influenced the disparity between the total points for the Atlantic division, which has the highest total points, and the Northwest division, which has the lowest total points. One example of such an explanation can include, but is not limited to, the Atlantic division having the two highest scoring teams in the league, while the Northwest division has the three lowest scoring teams in the league. Other examples and configurations are also within the scope of the present disclosure.

It is contemplated that the visualization explanation system 500 can incorporate any of the other features disclosed herein.

Figure 6:
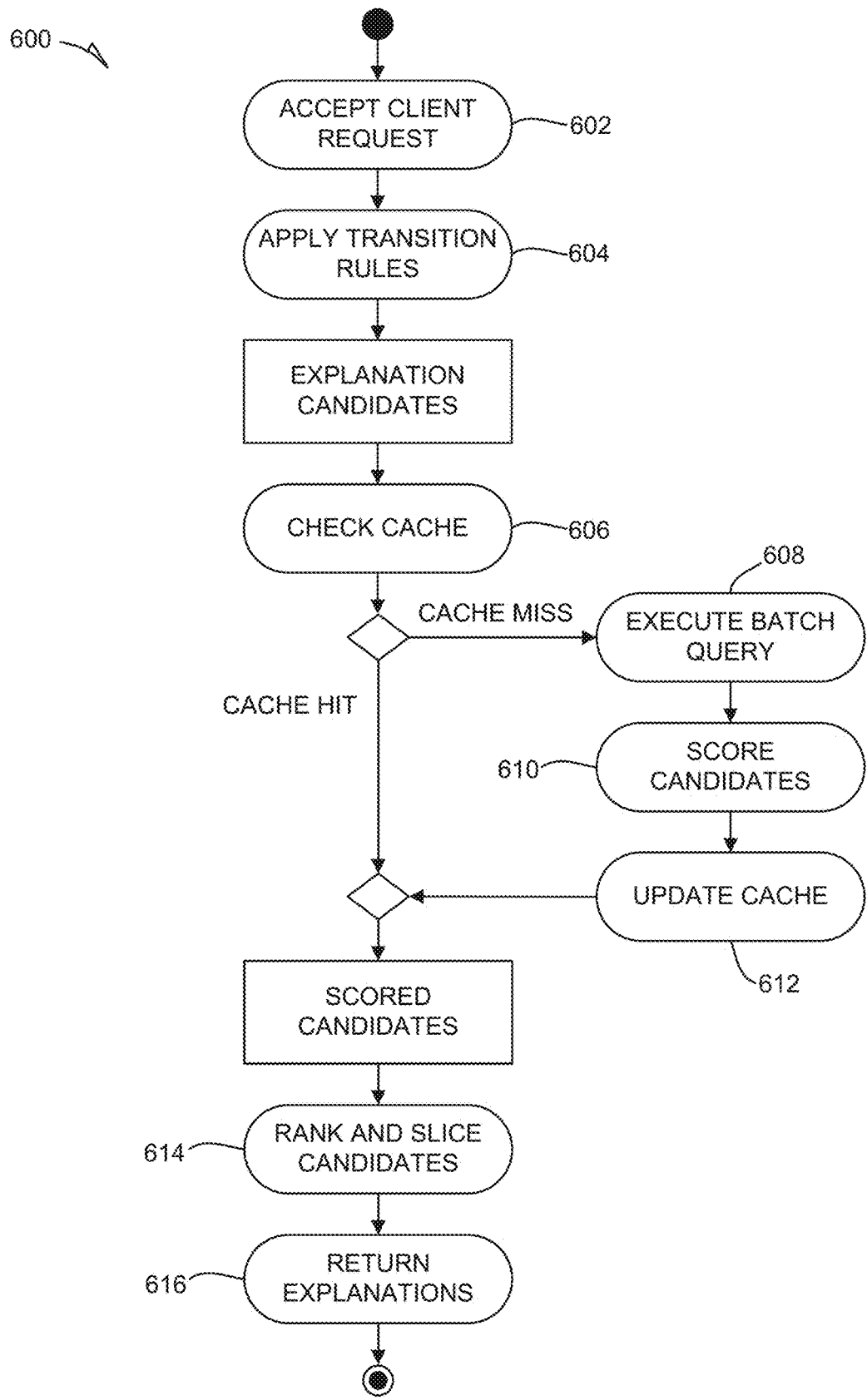
FIG. 6 is an activity diagram illustrating an activity flow of an explanation service, in accordance with some example embodiments.

FIG. 6 is an activity diagram illustrating an activity flow 600 of an explanation service, in accordance with some example embodiments. The operations of the activity flow 600 can be performed by processing logic that can comprise hardware (e.g., circuitry, dedicated logic, programmable logic, microcode, etc.), software (e.g., instructions run on a processing device), or a combination thereof. In one example embodiment, the activity flow 600 is performed by the explanation service 330 of FIG. 3 or the visualization explanation system 500 of FIG. 5, or any combination of one or more of their respective components or modules, as described above.

At point 602, a request can be accepted from a client, as previously discussed with respect to FIG. 3. The client request can comprise information describing or otherwise indicating details about a current visualization being displayed to a user on the client. At point 604, transition rules can be applied to the current visualization in order to generate explanation candidates, as previously discussed. A search space of options for generating explanation candidates can be iterated through according to the transition rules. At point 606, a cache can be checked to determine whether there are available scores for the explanation candidates, as previously discussed. If it is determined that there are available scores in the cache, then the corresponding scores are returned, and then the explanation candidates are ranked and sliced based on their corresponding scores at operation 614, as previously discussed. The selected explanation candidates can then be returned as explanations to the client at operation 616, as previously discussed.

Referring back to the checking of the cache at operation 606, if it is determined that there are not available scores in the cache, then, at operation 608, a batch query can be executed to obtain data to be used in scoring the explanation candidates, as previously discussed. At operation 610, the explanation candidates can then be scored, as previously discussed. At operation 612, the cache can then be updated with the scores for the explanation candidates. The scores can then be used to rank and slice the explanation candidates at operation 614, as previously discussed. It is contemplated that any of the other features described within the present disclosure can be incorporated into the activity flow 600.

Figure 7:
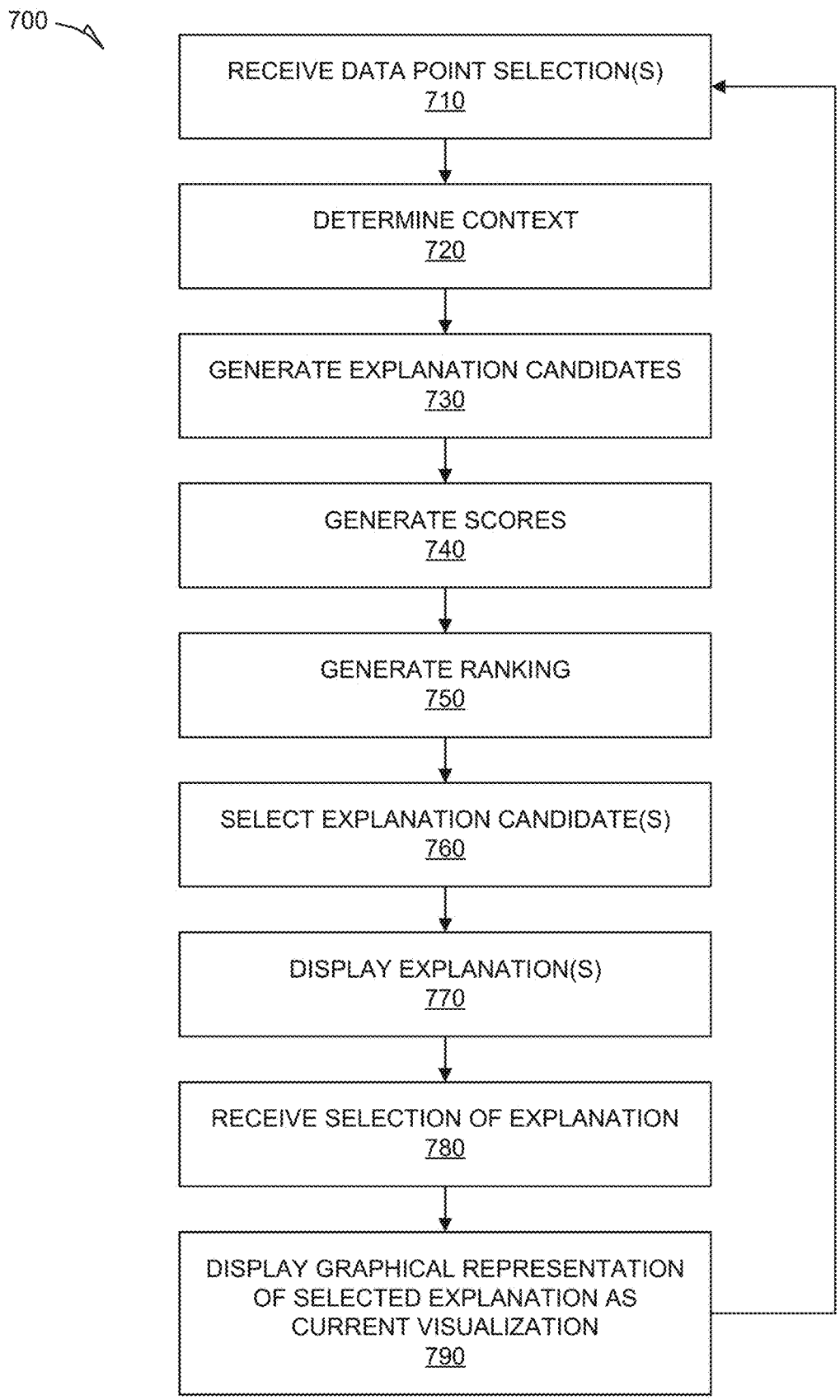
FIG. 7 is a flowchart illustrating a method of providing visualization explanations, in accordance with some example embodiments.

FIG. 7 is a flowchart illustrating a method 700 of providing visualization explanations, in accordance with some example embodiments. Method 700 can be performed by processing logic that can comprise hardware (e.g., circuitry, dedicated logic, programmable logic, microcode, etc.), software (e.g., instructions run on a processing device), or a combination thereof. In one example embodiment, the method 700 is performed by the explanation service 330 of FIG. 3 or the visualization explanation system 500 of FIG. 5, or any combination of one or more of their respective components or modules, as described above.

At operation 710, a current visualization of at least a portion of data of a dataset can be displayed to a user in a graphical user interface of a device, and an indication of one or more selected data points of a current visualization can be received. The selected data point(s) can be one or more of a plurality of data points of the current visualization. The current visualization can comprise a graphical representation of the plurality of data points, and each one of the plurality of data points can have a corresponding dimension and measure.

At operation 720, a context of the selected data point(s) can be determined based on the corresponding dimension of the data point(s). At operation 730, a plurality of explanation candidates can be generated based on the context of the selected data point(s). Each one of the plurality of exploration candidates can have a different dimension context that is within the context of the selected data point(s), as well as a corresponding value for the dimension context. At operation 740, for each one of the plurality of explanation candidates, a corresponding score can be generated based on a difference between the corresponding value for the corresponding explanation candidate and an average value of all of the corresponding values of the plurality of explanation candidates. At operation 750, a ranking of the plurality of explanation candidates can be generated based on the scores. For example, the plurality of explanation candidates can be ranked in ascending order or descending order of scores. At operation 760, at least one of the explanation candidates can be selected based on the ranking; For example, the top N-ranked explanation candidates (e.g., N explanation candidates with the highest scores) can be selected, where N is a predetermined number of one or greater.

At operation 770, a corresponding selectable explanation for each one of the selected at least one explanation candidate can be caused to be displayed to a user in a graphical user interface of a device concurrently with the current visualization. At operation 780, a user selection of the corresponding selectable explanation of one of the selected explanation candidate(s) can be received or detected. At operation 790, a graphical representation corresponding to the selected explanation can be caused to be displayed as a subsequent current visualization in the first dedicated section.

It is contemplated that any of the other features described within the present disclosure can be incorporated into method 700.

Example Mobile Device

Figure 8:
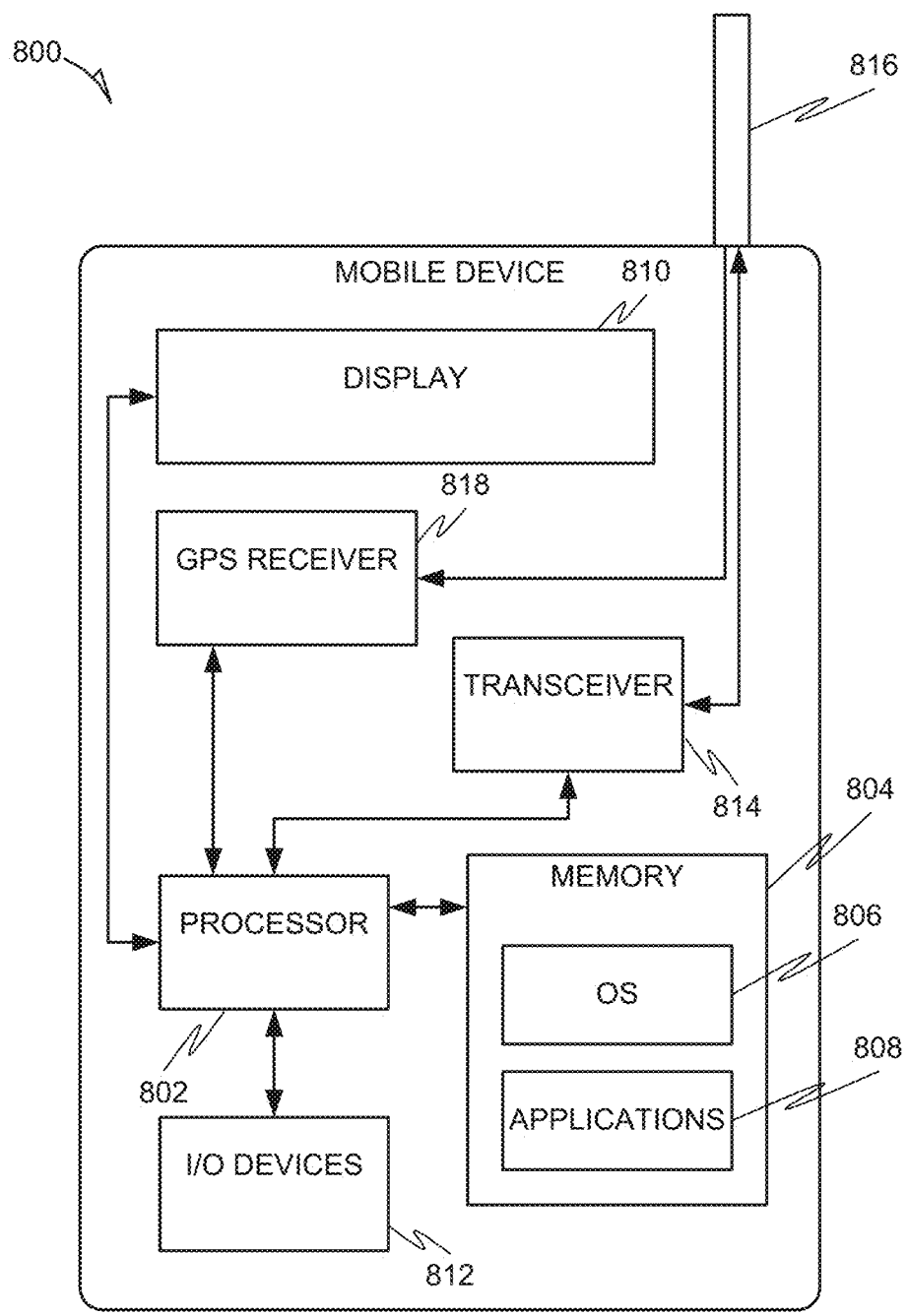
FIG. 8 is a block diagram illustrating a mobile device, in accordance with some example embodiments.

FIG. 8 is a block diagram illustrating a mobile device 800, according to some example embodiments. The mobile device 800 can include a processor 802. The processor 802 can be any of a variety of different types of commercially available processors suitable for mobile devices 800 (for example, an XScale architecture microprocessor, a Microprocessor without Interlocked Pipeline Stages (MIPS) architecture processor, or another type of processor). A memory 804, such as a random access memory (RAM), a Flash memory, or other type of memory, is typically accessible to the processor 802. The memory 804 can be adapted to store an operating system (OS) 806, as well as application programs 808, such as a mobile location enabled application that can provide LBSs to a user. The processor 802 can be coupled, either directly or via appropriate intermediary hardware, to a display 810 and to one or more input/output (I/O) devices 812, such as a keypad, a touch panel sensor, a microphone, and the like. Similarly, in some example embodiments, the processor 802 can be coupled to a transceiver 814 that interfaces with an antenna 816. The transceiver 814 can be configured to both transmit and receive cellular network signals, wireless data signals, or other types of signals via the antenna 816, depending on the nature of the mobile device 800. Further, in some configurations, a GPS receiver 818 can also make use of the antenna 816 to receive GPS signals.

Modules, Components and Logic

Certain embodiments are described herein as including logic or a number of components, modules, or mechanisms. Modules can constitute either software modules (e.g., code embodied on a machine-readable medium or in a transmission signal) or hardware modules. A hardware module is a tangible unit capable of performing certain operations and can be configured or arranged in a certain manner. In example embodiments, one or more computer systems (e.g., a standalone, client, or server computer system) or one or more hardware modules of a computer system (e.g., a processor or a group of processors) can be configured by software (e.g., an application or application portion) as a hardware module that operates to perform certain operations as described herein.

In various embodiments, a hardware module can be implemented mechanically or electronically. For example, a hardware module can comprise dedicated circuitry or logic that is permanently configured (e.g., as a special-purpose processor, such as a field programmable gate array (FPGA) or an application-specific integrated circuit (ASIC)) to perform certain operations. A hardware module can also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) can be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor can be configured as respective different hardware modules at different times. Software can accordingly configure a processor, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple of such hardware modules exist contemporaneously, communications can be achieved through signal transmission (e.g., over appropriate circuits and buses) that connect the hardware modules. In embodiments in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one or more processors or processor-implemented modules. The performance of certain of the operations can be distributed among the one or more processors, not only residing within a single machine, but deployed across a number of machines. In some example embodiments, the processor or processors can be located in a single location (e.g., within a home environment, an office environment or as a server farm), while in other embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network (e.g., the network 114 of FIG. 1) and via one or more appropriate interfaces (e.g., APIs).

Example embodiments can be implemented in digital electronic circuitry, or in computer hardware, firmware, software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine) and software architectures that can be deployed, in various example embodiments.

Figure 9:
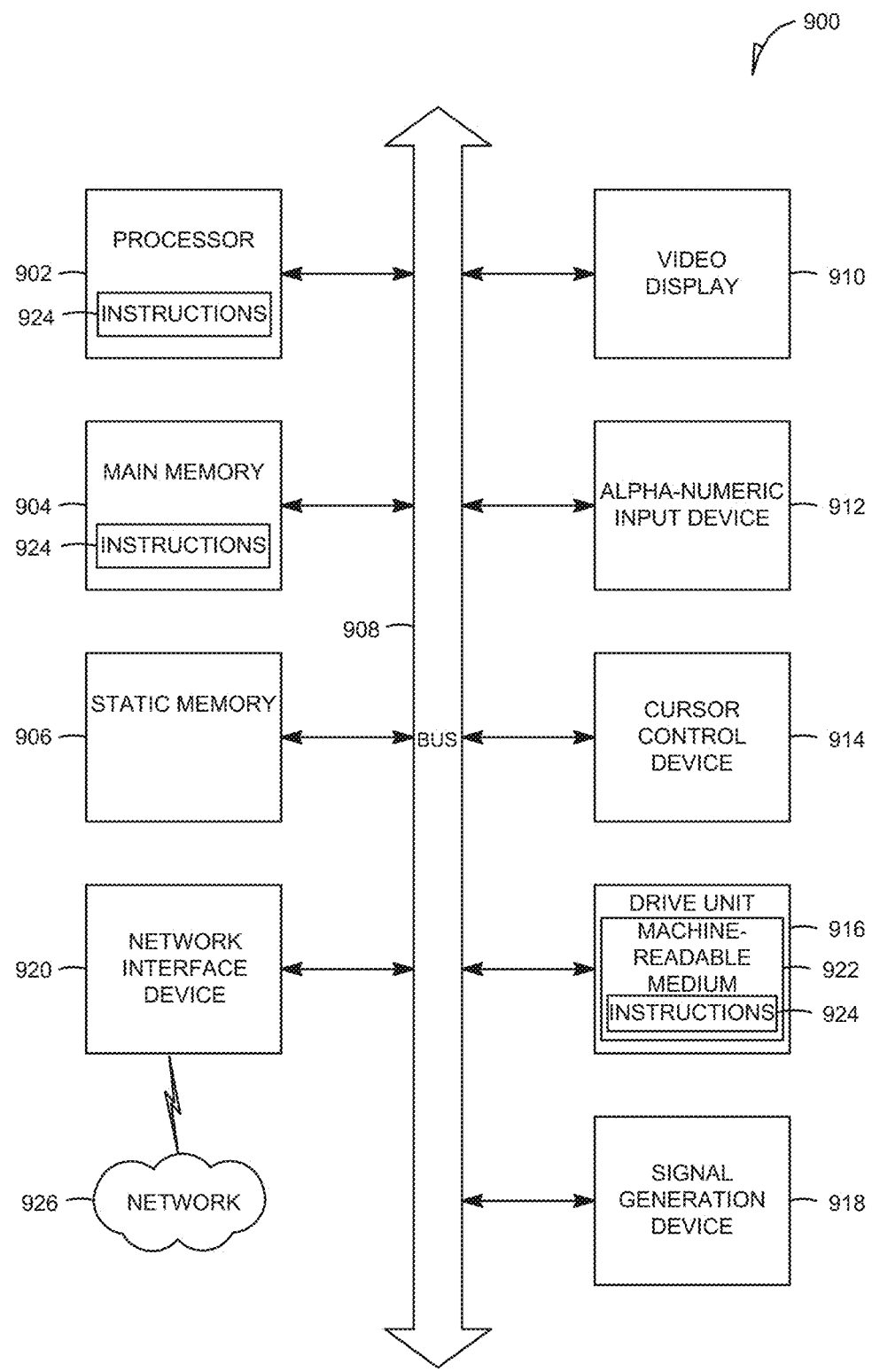
FIG. 9 is a block diagram of an example computer system on which methodologies described herein can be executed, in accordance with some example embodiments.

FIG. 9 is a block diagram of a machine in the example form of a computer system 900 within which instructions 924 for causing the machine to perform any one or more of the methodologies discussed herein can be executed, in accordance with some example embodiments. In alternative embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 can further include a video display unit 910 (e.g., a liquid crystal display (LCD) or a cathode ray tube (CRT)). The computer system 900 also includes an alphanumeric input device 912 (e.g., a keyboard), a user interface (UI) navigation (or cursor control)

device 914 (e.g., a mouse), a disk drive unit 916, a signal generation device 918 (e.g., a speaker) and a network interface device 920.

The disk drive unit 916 includes a machine-readable medium 922 on which is stored one or more sets of data structures and instructions 924 (e.g., software) embodying or utilized by any one or more of the methodologies or functions described herein. The instructions 924 can also reside, completely or at least partially, within the main memory 904 and/or within the processor 902 during execution thereof by the computer system 900, the main memory 904 and the processor 902 also constituting machine-readable media. The instructions 924 can also reside, completely or at least partially, within the static memory 906.

While the machine-readable medium 922 is shown in an example embodiment to be a single medium, the term "machine-readable medium" can include a single medium or multiple media (e.g., a centralized or distributed database, and/or associated caches and servers) that store the one or more instructions 924 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 924 can further be transmitted or received over a communications network 926 using a transmission medium. The instructions 924 can be transmitted using the network interface device 920 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes can be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
   at least one processor on a server; and
   a non-transitory computer-readable medium, coupled to the server, storing executable instructions that, when executed, cause the at least one processor to perform operations comprising:
   receiving an indication of a selected data point of a current visualization, the current visualization comprising a graphical representation of the plurality of data points, each one of the plurality of data points having a corresponding dimension and measure;
   determining a context of the selected data point based on the corresponding dimension of the data point;
   generating a plurality of explanation candidates based on the context, each one of the plurality of explanation candidates having a different dimension context that is within the context of the selected data point and a corresponding value for the dimension context;
   selecting at least one of the explanation candidates based on a difference between the corresponding value for each one of the selected at least one of the explanation candidates and an average value of the values of the plurality of explanation candidates being greater than a difference between the corresponding values of non-selected ones of the plurality of explanation candidates and the average value of the values of the plurality of explanation candidates; and
   causing a corresponding selectable explanation for each one of the selected at least one explanation candidate to be displayed to a user in a graphical user interface of a client device concurrently with the current visualization, the corresponding selectable explanation for each one of the selected at least one explanation candidate comprising the corresponding value of the corresponding one of the selected at least one explanation candidate.

2. The system of claim 1, wherein the indication comprises a user-generated interrupt based on a user selection of the data point.

3. The system of claim 1, wherein the operations further comprise causing the current visualization to be displayed in a first dedicated section of the graphical user interface for current visualizations, and causing the corresponding selectable explanation for each one of the selected at least one explanation candidate to be displayed in a second dedicated section of the graphical user interface for explanations.

4. The system of claim 3, wherein the operations further comprise:
   detecting a user selection of the corresponding selectable explanation of one of the selected at least one explanation candidate; and causing a graphical representation corresponding to the selected explanation to be displayed as a subsequent current visualization in the first dedicated section.

5. The system of claim 1, wherein the current visualization comprises a chart.

6. The system of claim 1, wherein each measure of the plurality of data points comprises a numeric value.

7. The system of claim 1, wherein each corresponding value for the plurality of explanation candidates comprises a maximum value for the corresponding dimension context of the corresponding explanation candidate.

8. The system of claim 1, wherein the server is remote from the client device and operatively connected, via a network, to the client device.

9. The system of claim 1, wherein the selecting of the at least one of the explanation candidates comprises:
    generating, for each one of the plurality of explanation candidates, a corresponding score based on a difference between the value for the corresponding explanation candidate and an average value of the values of the plurality of explanation candidates, the difference affecting the corresponding score positively, such that the greater the difference is, the greater the corresponding score will be; and
    selecting the at least one of the explanation candidates based on the corresponding scores for each one of the selected at least one of the explanation candidates.

10. A computer-implemented method comprising:
    receiving, by a server machine having a memory and at least one processor, an indication of a selected data point of a current visualization, the current visualization comprising a graphical representation of the plurality of data points, each one of the plurality of data points having a corresponding dimension and measure;
    determining, by the server machine, a context of the selected data point based on the corresponding dimension of the data point;
    generating, by the server machine, a plurality of explanation candidates based on the context, each one of the plurality of explanation candidates having a different dimension context that is within the context of the selected data point and a corresponding value for the dimension context;
    selecting, by the server machine, at least one of the explanation candidates based on a difference between the corresponding value for each one of the selected at least one of the explanation candidates and an average value of the values of the plurality of explanation candidates being greater than a difference between the corresponding values of non-selected ones of the plurality of explanation candidates and the average value of the values of the plurality of explanation candidates; and
    causing, by the server machine, a corresponding selectable explanation for each one of the selected at least one explanation candidate to be displayed to a user in a graphical user interface of a client device concurrently with the current visualization, the corresponding selectable explanation for each one of the selected at least one explanation candidate comprising the corresponding value of the corresponding one of the selected at least one explanation candidate.

11. The computer-implemented method of claim 10, wherein the indication comprises a user-generated interrupt based on a user selection of the data point.

12. The computer-implemented method of claim 10, further comprising causing, by the server machine, the current visualization to be displayed in a first dedicated section of the graphical user interface for current visualizations, and causing the corresponding selectable explanation for each one of the selected at least one explanation candidate to be displayed in a second dedicated section of the graphical user interface for explanations.

13. The computer-implemented method of claim 12, further comprising:
    detecting, by the server machine, a user selection of the corresponding selectable explanation of one of the selected at least one explanation candidate; and
    causing, by the server machine, a graphical representation corresponding to the selected explanation to be displayed as a subsequent current visualization in the first dedicated section.

14. The computer-implemented method of claim 10, wherein the current visualization comprises a chart.

15. The computer-implemented method of claim 10, wherein each measure of the plurality of data points comprises a numeric value.

16. The computer-implemented method of claim 10, wherein each corresponding value for the plurality of explanation candidates comprises a maximum value for the corresponding dimension context of the corresponding explanation candidate.

17. The computer-implemented method of claim 10, wherein the server machine is remote from the client device and operatively connected, via a network, to the client device.

18. The computer-implemented method of claim 10, wherein the selecting of the at least one of the explanation candidates comprises:
    generating, for each one of the plurality of explanation candidates, a corresponding score based on a difference between the value for the corresponding explanation candidate and an average value of the values of the plurality of explanation candidates, the difference affecting the corresponding score positively, such that the greater the difference is, the greater the corresponding score will be; and
    selecting the at least one of the explanation candidates based on the corresponding scores for each one of the selected at least one of the explanation candidates.

19. A non-transitory machine-readable storage medium, tangibly embodying a set of instructions that, when executed by at least one processor, causes the at least one processor to perform a set of operations comprising:
    receiving an indication of a selected data point of a current visualization, the current visualization comprising a graphical representation of the plurality of data points, each one of the plurality of data points having a corresponding dimension and measure;
    determining a context of the selected data point based on the corresponding dimension of the data point;
    generating a plurality of explanation candidates based on the context, each one of the plurality of explanation candidates having a different dimension context that is within the context of the selected data point and a corresponding value for the dimension context;
    selecting at least one of the explanation candidates based on a difference between the corresponding value for each one of the selected at least one of the explanation candidates and an average value of the values of the plurality of explanation candidates being greater than a difference between the corresponding values of non-selected ones of the plurality of explanation candidates and the average value of the values of the plurality of explanation candidates; and causing a corresponding selectable explanation for each one of the selected at least one explanation candidate to be displayed to a user in a graphical user interface of a client device concurrently with the current visualization, the corresponding selectable explanation for each one of the selected at least one explanation candidate comprising the corresponding value of the corresponding one of the selected at least one explanation candidate.

20. The non-transitory machine-readable storage medium of claim 19, wherein the current visualization comprises a chart.

\* \* \* \* \*